(12) United States Patent
Thompson et al.

(10) Patent No.: US 7,658,056 B2
(45) Date of Patent: Feb. 9, 2010

(54) SYSTEM FOR FOLDING AN AGRICULTURAL MACHINE WITH A FLOATING WORK TOOL

(75) Inventors: Kent L. Thompson, Otley, IA (US); Shane A. Bollinger, Leighton, IA (US); Stuart Gene Van Donselaar, New Sharon, IA (US)

(73) Assignee: Vermeer Manufacturing Co., Pella, IA (US)

( * ) Notice: Subject to any disclaimer, the term of this patent is extended or adjusted under 35 U.S.C. 154(b) by 0 days.

(21) Appl. No.: 11/928,082

(22) Filed: Oct. 30, 2007

(65) Prior Publication Data

US 2009/0107096 A1    Apr. 30, 2009

(51) Int. Cl.
*A01D 34/00* (2006.01)

(52) U.S. Cl. ....................................................... 56/15.8

(58) Field of Classification Search ................... 56/15.8, 56/15.7, 15.2, 14.7, 13.6, 6, 15.1, 192; 172/282, 172/311, 213
See application file for complete search history.

(56) References Cited

U.S. PATENT DOCUMENTS

| | | | | | |
|---|---|---|---|---|---|
| 3,517,491 | A | * | 6/1970 | Harer et al. | ................... 56/11.9 |
| 3,587,217 | A | * | 6/1971 | Lausch et al. | ............... 56/327.1 |
| 3,592,106 | A | | 7/1971 | Baughman | |
| 4,177,627 | A | | 12/1979 | Cicci | |
| 4,207,802 | A | | 6/1980 | Homuth | |
| 4,344,639 | A | * | 8/1982 | Pollard | ............................. 56/6 |
| 4,381,118 | A | * | 4/1983 | Weeks | ......................... 280/412 |
| 4,599,852 | A | | 7/1986 | Kerber | |
| 4,719,742 | A | | 1/1988 | Ermacora | |
| 4,723,396 | A | * | 2/1988 | Ermacora | .................... 56/13.6 |
| 4,723,401 | A | | 2/1988 | Webster | |
| 4,724,661 | A | | 2/1988 | Blakeslee | |
| 4,991,383 | A | * | 2/1991 | Ermarcora | .................. 56/14.9 |
| 5,060,462 | A | | 10/1991 | Helfer | |
| 5,062,489 | A | * | 11/1991 | Adee | ........................... 172/311 |
| 5,094,063 | A | * | 3/1992 | Wattron et al. | ..................... 56/6 |
| 5,107,663 | A | * | 4/1992 | Wattron et al. | ............... 56/15.7 |
| 5,199,249 | A | * | 4/1993 | Wattron et al. | ............... 56/15.2 |
| 5,199,250 | A | * | 4/1993 | Ermacora et al. | ............ 56/15.2 |
| 5,272,859 | A | * | 12/1993 | Pruitt et al. | .................. 56/15.2 |
| 5,417,042 | A | | 5/1995 | Walch | |
| 5,423,165 | A | * | 6/1995 | Walch et al. | ...................... 56/6 |

(Continued)

FOREIGN PATENT DOCUMENTS

DE    4314250    7/1994

(Continued)

OTHER PUBLICATIONS

1 Sheet showing a New Holland—Section 8 Hydraulic Cylinder.

*Primary Examiner*—Árpád Fábián-Kovács
(74) *Attorney, Agent, or Firm*—Sturm & Fix LLP (57) ABSTRACT

A drive system for agricultural implements having at least one floating head and a tongue that may be disposed at various angles relative to a longitudinal angle of the implement. Two swivel gearbox assemblies are used, each comprising a first 90° gearbox rigidly attached to the implement and a second 90° gearbox that is permitted to rotate about an axis passing through one of its shafts and one of the first 90° gearbox's shaft. Because the tongue angle is variable, the drive shafts for driving the implement must take on a plurality of angles. The swiveling gearbox assemblies allow variable angles at the tongue and at the header.

27 Claims, 12 Drawing Sheets

U.S. PATENT DOCUMENTS

| | | | |
|---|---|---|---|
| 5,544,475 A * | 8/1996 | Skibo | 56/15.5 |
| 5,566,535 A * | 10/1996 | Pruitt | 56/15.1 |
| 5,566,536 A | 10/1996 | Krafka | |
| 5,566,537 A * | 10/1996 | Kieffer et al. | 56/15.2 |
| 5,642,607 A * | 7/1997 | Stephenson et al. | 56/15.1 |
| 5,901,537 A * | 5/1999 | Walch et al. | 56/15.2 |
| 5,966,916 A * | 10/1999 | Laing | 56/377 |
| 5,992,133 A | 11/1999 | Walch | |
| 6,044,633 A * | 4/2000 | Stiefvater et al. | 56/16.4 R |
| 6,055,800 A * | 5/2000 | Walch | 56/16.7 |
| 6,085,501 A | 7/2000 | Walch | |
| 6,101,796 A * | 8/2000 | Wattron et al. | 56/13.6 |
| 6,186,043 B1 | 2/2001 | Callies | |
| 6,189,306 B1 * | 2/2001 | Walch | 56/15.1 |
| 6,238,170 B1 * | 5/2001 | Pingry et al. | 414/550 |
| 6,250,055 B1 | 6/2001 | Franet | |
| 6,260,629 B1 * | 7/2001 | Toth | 172/282 |
| 6,273,449 B1 * | 8/2001 | Harkcom et al. | 280/491.3 |
| 6,308,504 B1 * | 10/2001 | Walch et al. | 56/16.4 R |
| 6,354,382 B1 * | 3/2002 | Jarman et al. | 172/213 |
| 6,360,516 B1 | 3/2002 | Harkcom | |
| 6,381,935 B1 * | 5/2002 | Wattron et al. | 56/14.9 |
| 6,612,102 B2 * | 9/2003 | Walch et al. | 56/192 |
| 6,655,118 B1 * | 12/2003 | Thompson et al. | 56/15.8 |
| 6,662,540 B1 | 12/2003 | Harkcom | |
| 6,666,010 B2 * | 12/2003 | Beaufort et al. | 56/228 |
| 6,679,038 B2 * | 1/2004 | Walch et al. | 56/192 |
| 6,698,113 B1 | 3/2004 | Jones | |
| 6,758,031 B2 | 7/2004 | Franet | |
| 6,845,603 B1 * | 1/2005 | Stephenson et al. | 56/218 |
| 6,865,873 B2 * | 3/2005 | Menichetti | 56/367 |
| 6,907,719 B2 | 6/2005 | Ligouy | |
| 7,024,844 B2 | 4/2006 | Schlesser | |
| 7,047,714 B1 | 5/2006 | Stephenson | |
| 7,100,351 B2 * | 9/2006 | Rowse et al. | 56/377 |
| 7,207,166 B2 * | 4/2007 | Stephenson | 56/15.2 |
| 2001/0037887 A1 * | 11/2001 | Friggstad | 172/459 |
| 2003/0182912 A1 * | 10/2003 | Boll | 56/14.7 |
| 2003/0221401 A1 * | 12/2003 | Ligouy | 56/14.7 |
| 2004/0035288 A1 | 2/2004 | Hawthorne | |
| 2005/0076630 A1 * | 4/2005 | Tonutti | 56/378 |
| 2006/0090910 A1 * | 5/2006 | Houck | 172/272 |
| 2007/0144130 A1 | 6/2007 | Geiser | |

FOREIGN PATENT DOCUMENTS

| | | |
|---|---|---|
| DE | 4407812 | 9/1995 |
| EP | 0503395 | 9/1992 |
| EP | 1616474 | 1/2006 |
| FR | 2723503 A1 * | 2/1996 |
| GB | 2232055 | 12/1990 |
| WO | WO9740660 A1 * | 8/1982 |

* cited by examiner

SYSTEM FOR FOLDING AN AGRICULTURAL MACHINE WITH A FLOATING WORK TOOL

CROSS REFERENCE TO RELATED APPLICATIONS

U.S. patent application Ser. No. 11/927,866 filed Oct. 30, 2007 (Our Reference 2-5169-110) and U.S. patent application Ser. No. 11/928,010 filed Oct. 30, 2007 (Our Reference 2-5169-111) are hereby incorporated by reference herein in their entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement, including a floating work tool. More particularly, the present invention relates to an improved drive system for agricultural implements having one or more floating work tools.

2. Background Art

Some towable agricultural implements require that the implement be towed off to one side of the tractor when in operation—possibly with the ability to be towed on either side—and directly behind the tractor for transport. The towing at these various locations is effected by angling the implement tongue relative to an implement longitudinal axis, while maintaining an orientation of an implement frame with respect to that longitudinal axis. The need for this flexibility presents difficulties in providing shaft power smoothly to the implement regardless of the tongue angle. Universal joints are relatively inexpensive and permit changes of drive direction, but reduce energy transfer efficiency, are unable to accommodate great angles, and produce oscillating power transfer when at and angle. Furthermore, universal joints require regular maintenance and eventual replacement.

There is, therefore, a need for a method and apparatus for providing shaft power to towed implements having the ability to operate with varying tongue angles.

BRIEF SUMMARY OF THE INVENTION

An object of the present invention is to provide a drive system for a towed implement, such as an agricultural mower, permitting:

the implement tongue to be angled through a range of angles relative to a longitudinal axis of the implement;
a header of the implement to be raised and lowered; and
the implement header to be positioned for both transport and operation.

To effect the various aspects of the above object, two pairs of swiveling gearboxes are utilized, wherein the axis of rotation associated with their ability to swivel is vertical. Additionally, the drive shaft connecting a given pair of gearboxes rotates about the same axis of rotation. Each of the gearboxes in each pair alters the drive direction by 90°.

A tongue gearbox system comprises a swiveling pair of gearboxes wherein the upper gearbox is rigidly affixed to the underside of the implement tongue while the lower gearbox is free to rotate about the vertical axis of rotation. The lower gearbox receives shaft power directly from the tractor Power Takeoff (PTO). The upper gearbox passes the shaft power along the drive shaft running to the implement. Because the lower gearbox can rotate relative to the tongue, the tongue may be angled through a range of angles relative to the longitudinal axis of the mower without inhibiting the shaft power transmission in any way. Hence, the implement may be towed directly behind the tractor or swung to either side of the tractor.

A sub-frame gearbox system comprises a swiveling pair of gearboxes wherein the lower, sub-frame gearbox is rigidly affixed to the sub-frame while the upper gearbox is free to rotate about the vertical axis of rotation. The implement tongue may be angled through a range of angles relative to the sub-frame and the upper gearbox swivels relative to the sub-frame to accommodate the various drive shaft angles. The sub-frame gearbox provides a 90° drive-angle change to drive the work tool(s).

Gear ratios may be selected for these swiveling gearbox assemblies as needed for a given application.

Other objects, advantages and novel features of the present invention will become apparent from the following detailed description of the invention when considered in conjunction with the accompanying drawings.

DETAILED DESCRIPTION OF THE INVENTION

Referring now to the drawings wherein like reference numerals indicate identical or corresponding parts throughout the several views, the present invention comprises a suspension system for an agricultural mower 1, shown in its entirety in FIGS. 1a-2c, and 5. The present invention relates to a drive system capable of transmitting rotation from a Power Takeoff (PTO) shaft of a towing tractor to the cutters of an agricultural mower having multiple frames able to pivot and rotate as described in U.S. patent application Ser. No. 11/927, 866, filed Oct. 30, 2007, which is hereby incorporated in its entirety by reference. The multi-frame mower 1 having the aforementioned motions enables the cutter bars 9 to float on the ground. Float provides the ability to engage the ground surface such that a consistent cut height is achieved. This desirable quality held by such a mower 1 requires the driveshaft configuration of the present invention.

In one embodiment, a two-point arm structure 3 is used to connect the mower tongue 2 to the two lower links of a 3-point tractor linkage (not shown) properly positioning the mower 1 such that the PTO shaft from the tractor can be connected to the tongue gearbox system 4 via an implement driveline 37 comprising a universal joint. The two-point arm 3, as particularly illustrated in FIG. 3, is connected to the tractor links by cylindrical pins 75 which pass through spherical bearings, or ball joints, in the tractor links to allow for ground slope variations in the direction of travel as well as relative roll angle between the tongue 2 and the tractor.

For the purposes of this document, including the claims, the usual direction of travel is hereby defined as the direction the agricultural mower 1 is drawn during mowing. For instance, in FIGS. 1a, 1b, and 5, said usual direction of travel is to the left.

Figure 5:
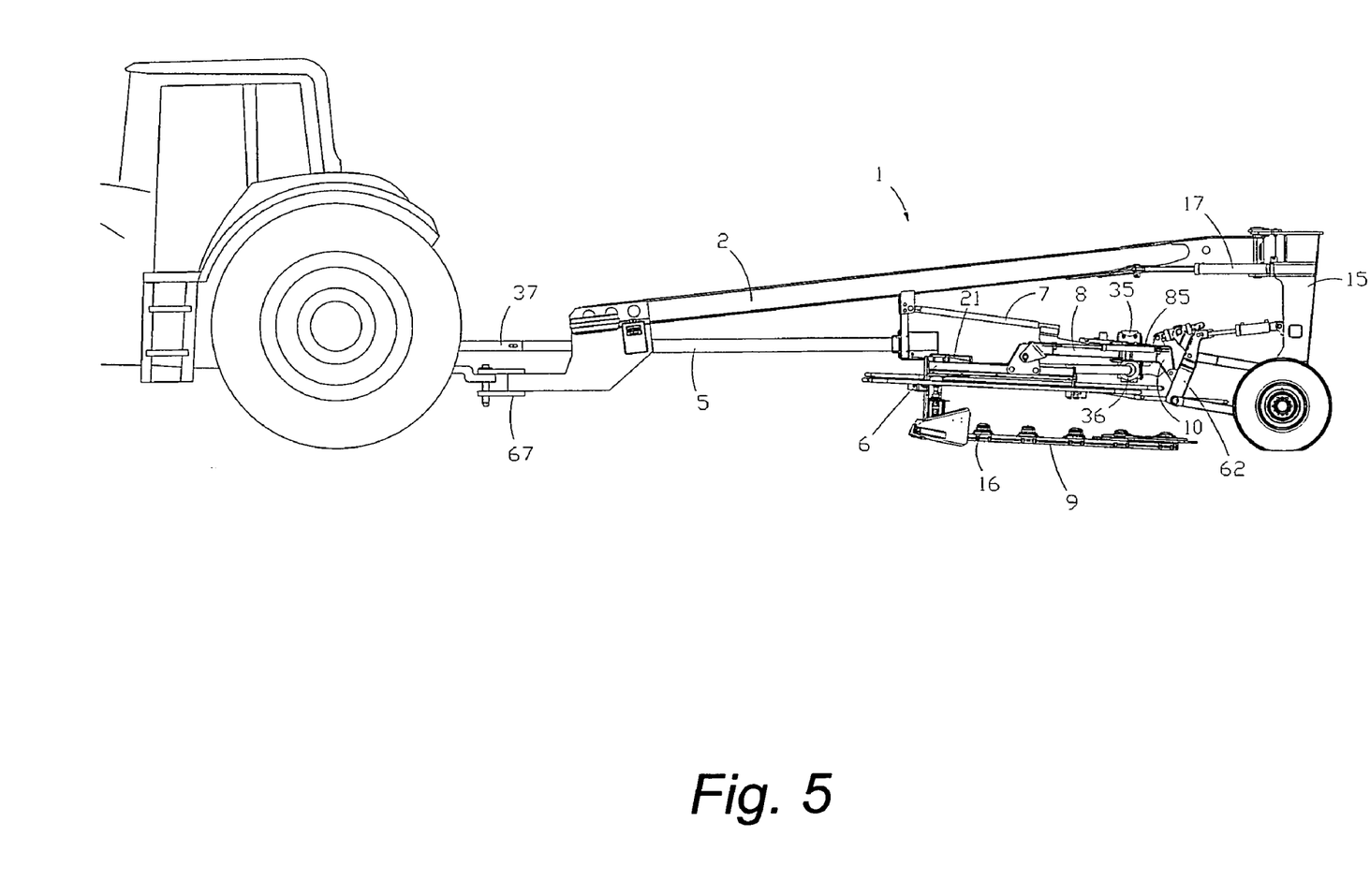
FIG. 5 is a side elevation of an agricultural mower in a transport configuration.
Figure 6:
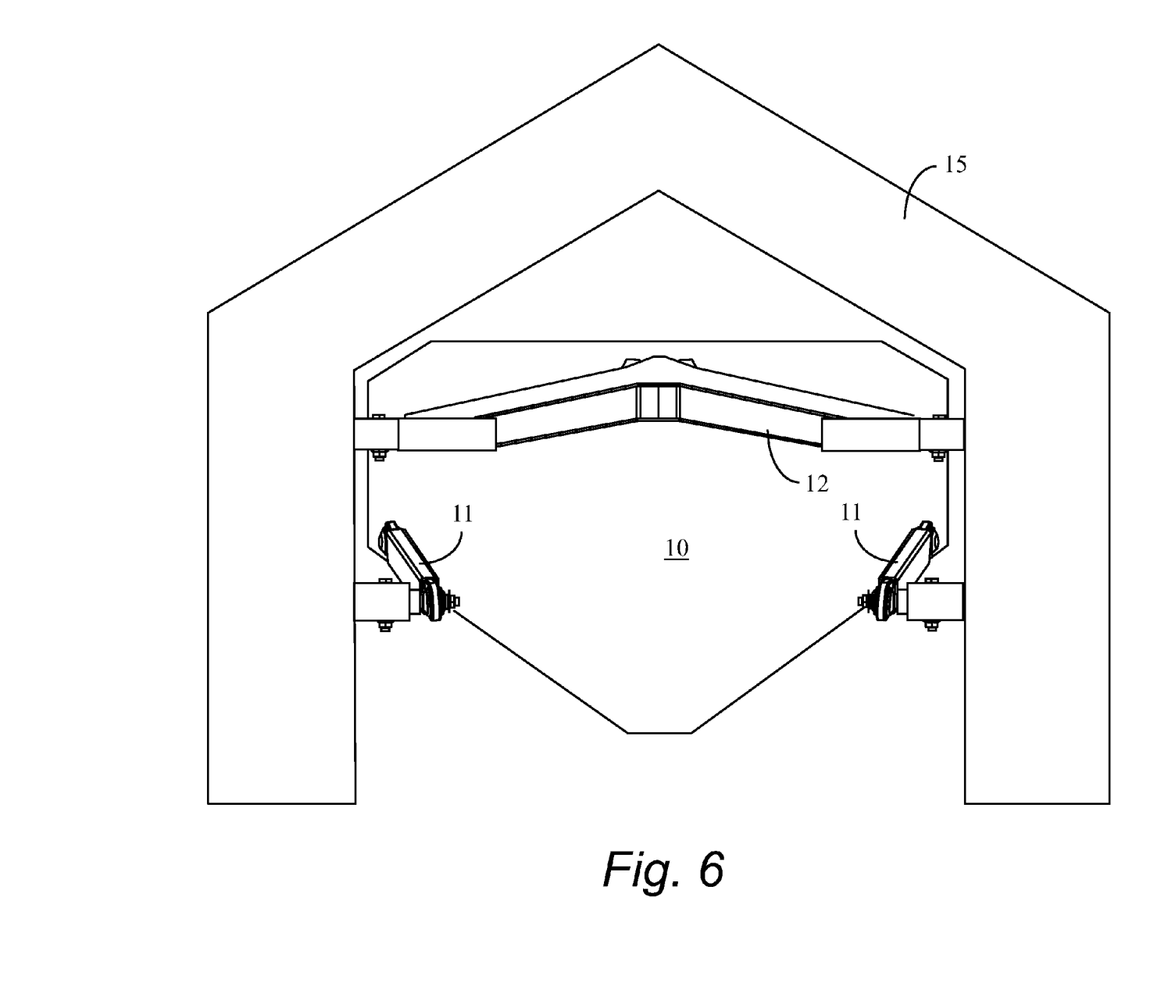
FIG. 6 is a rear elevation view of the mower in a first embodiment of the present invention.
Figure 7:
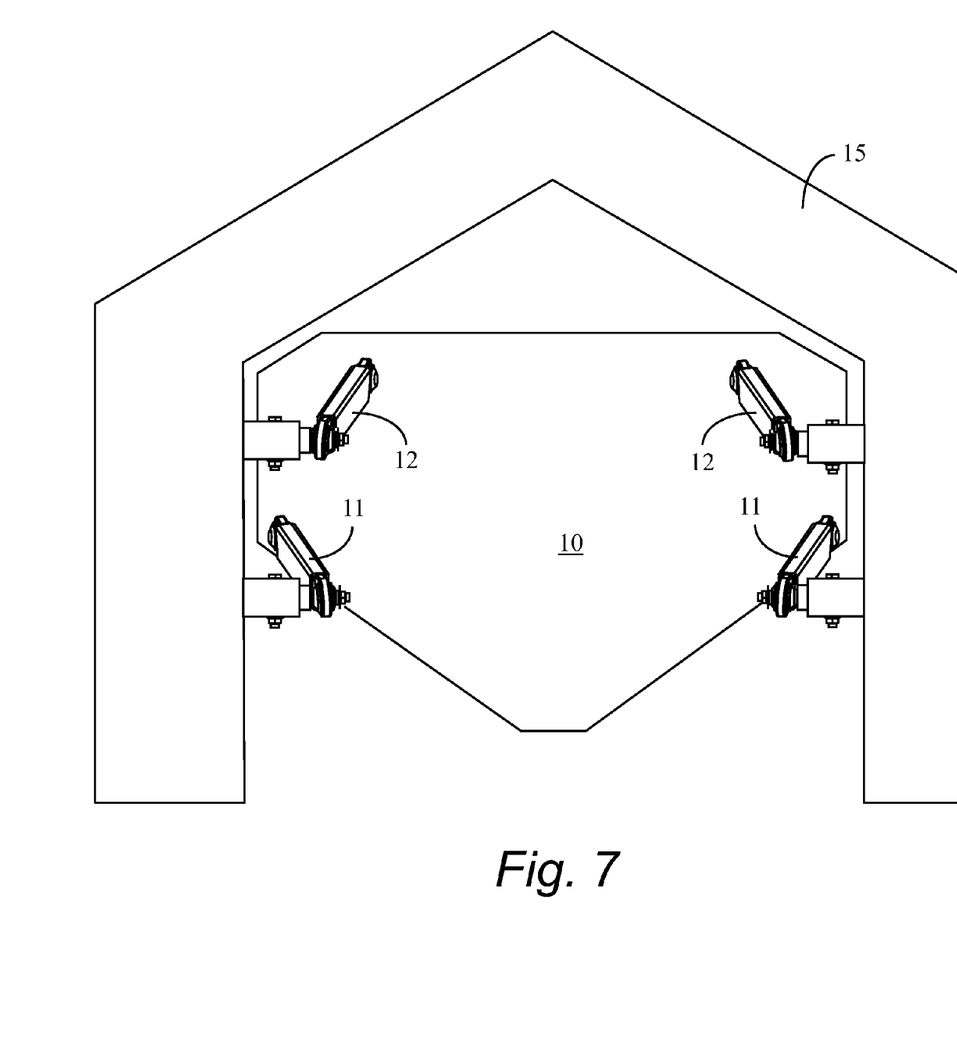
FIG. 7 is a rear elevation view of the mower in a second embodiment having individual linkage a top of the four-bar linkage system.
Figure 8:
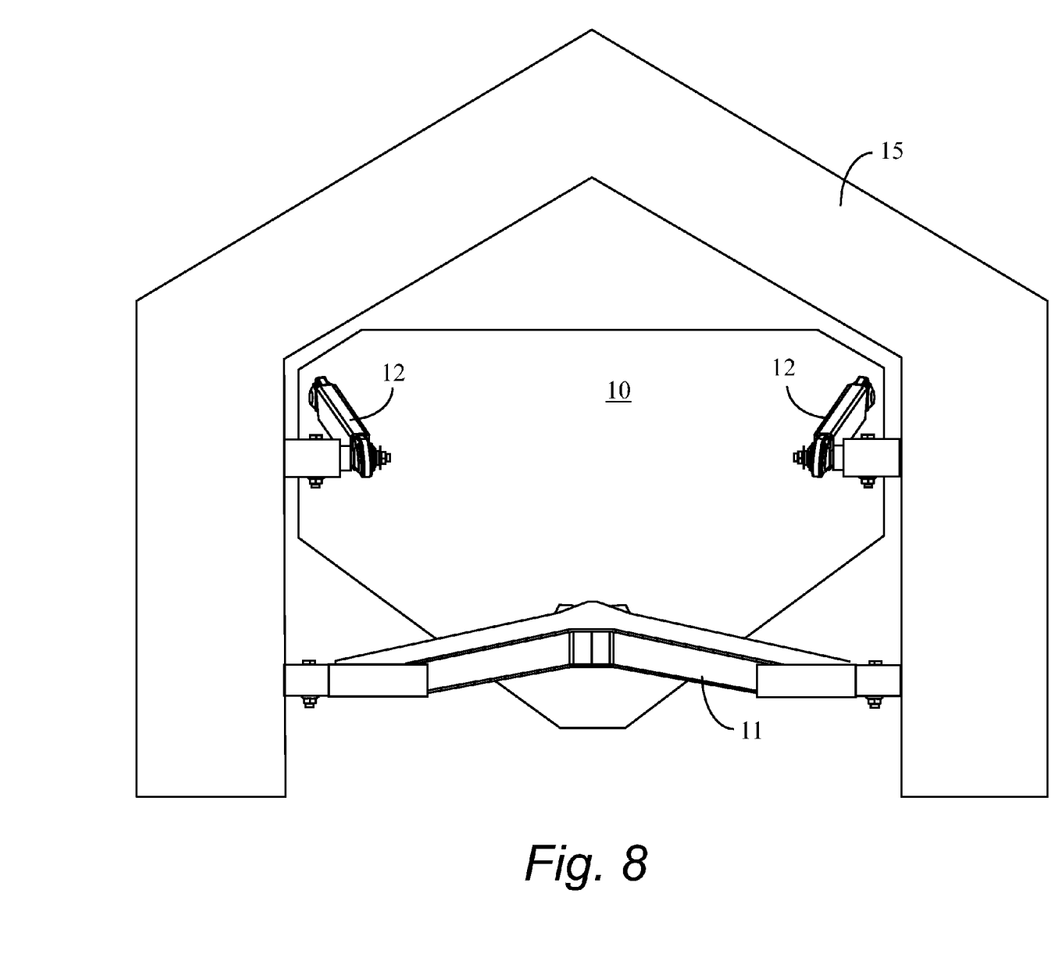
FIG. 8 is a rear elevation view of the mower presenting a third embodiment of the four-bar linkage system in which the orientations of the upper and lower linkage sets are opposite of those in the first embodiment.
Figure 9:
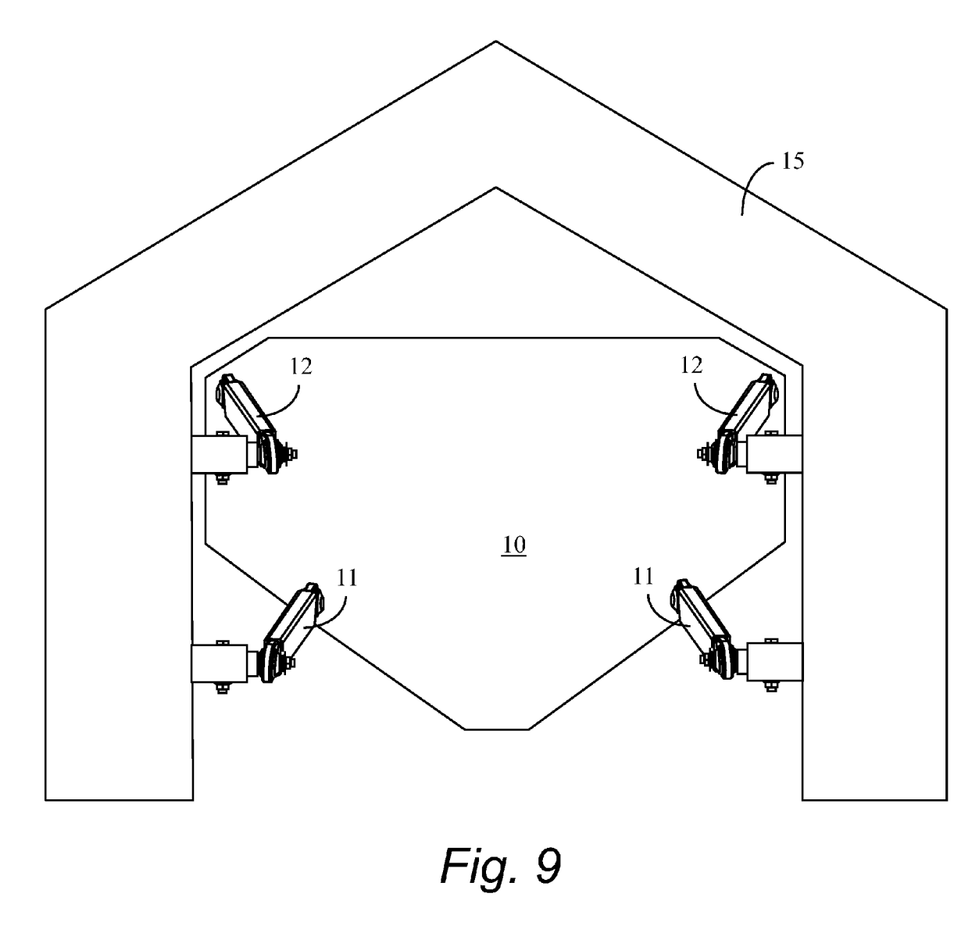
FIG. 9 is a rear elevation view of the mower presenting a forth embodiment of the four-bar linkage system in which the orientations of the upper and lower linkage sets are opposite of those in the second embodiment.

An alternative embodiment of the hitch system is shown in FIG. 5. In this embodiment, the tongue 2 is attached to a tractor drawbar by a pin-type hitch 67, thereby properly positioning the mower 1 to permit the tractor PTO shaft to be connected to a tongue jack-shaft (not shown) via an implement driveline 37 comprising a universal joint. The main shaft 5 connects to the jack shaft at the front of the tongue 2.

Figure 1A:
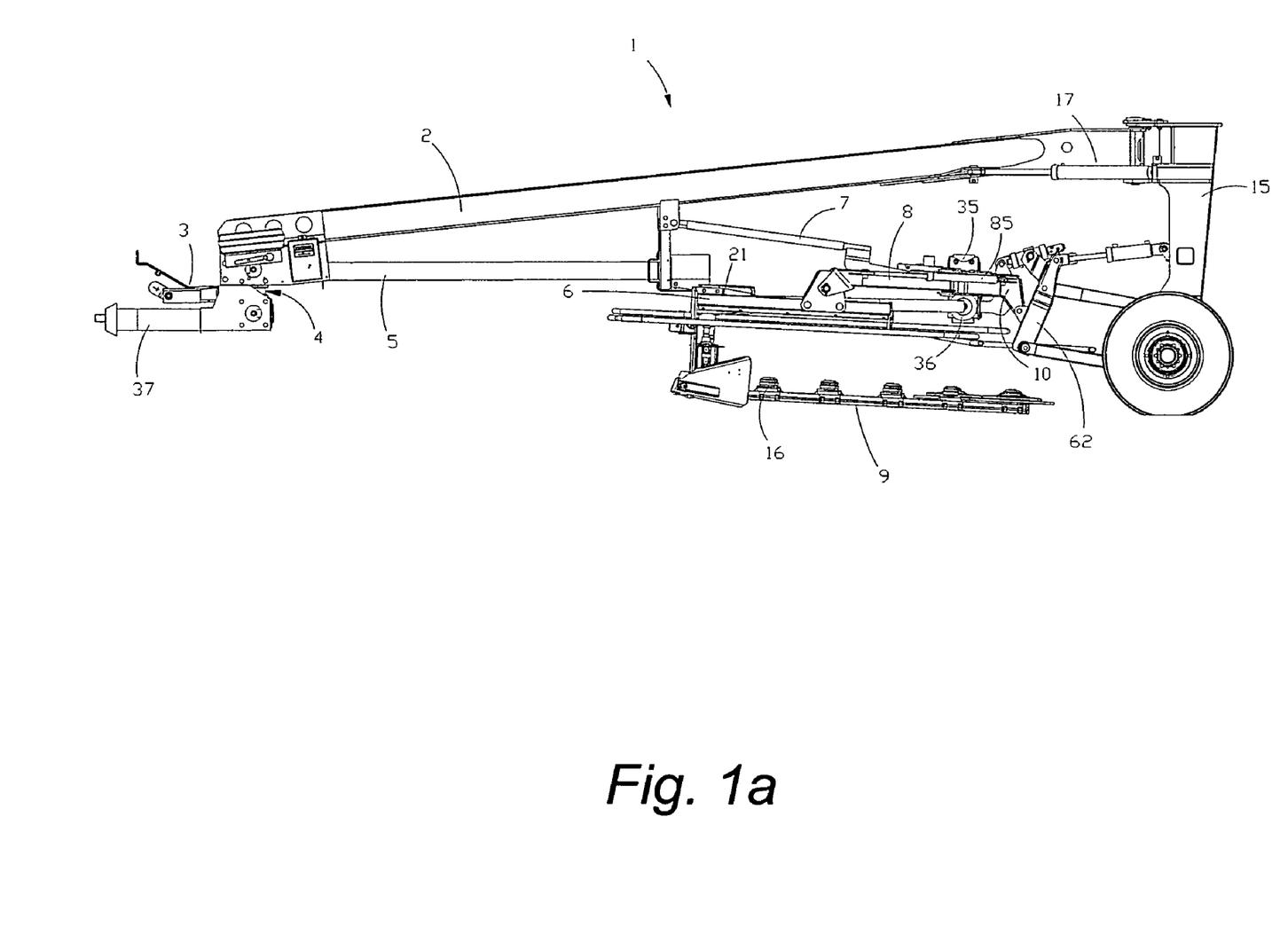
FIG. 1a is a side elevation of an agricultural mower in a transport configuration.
Figure 1B:
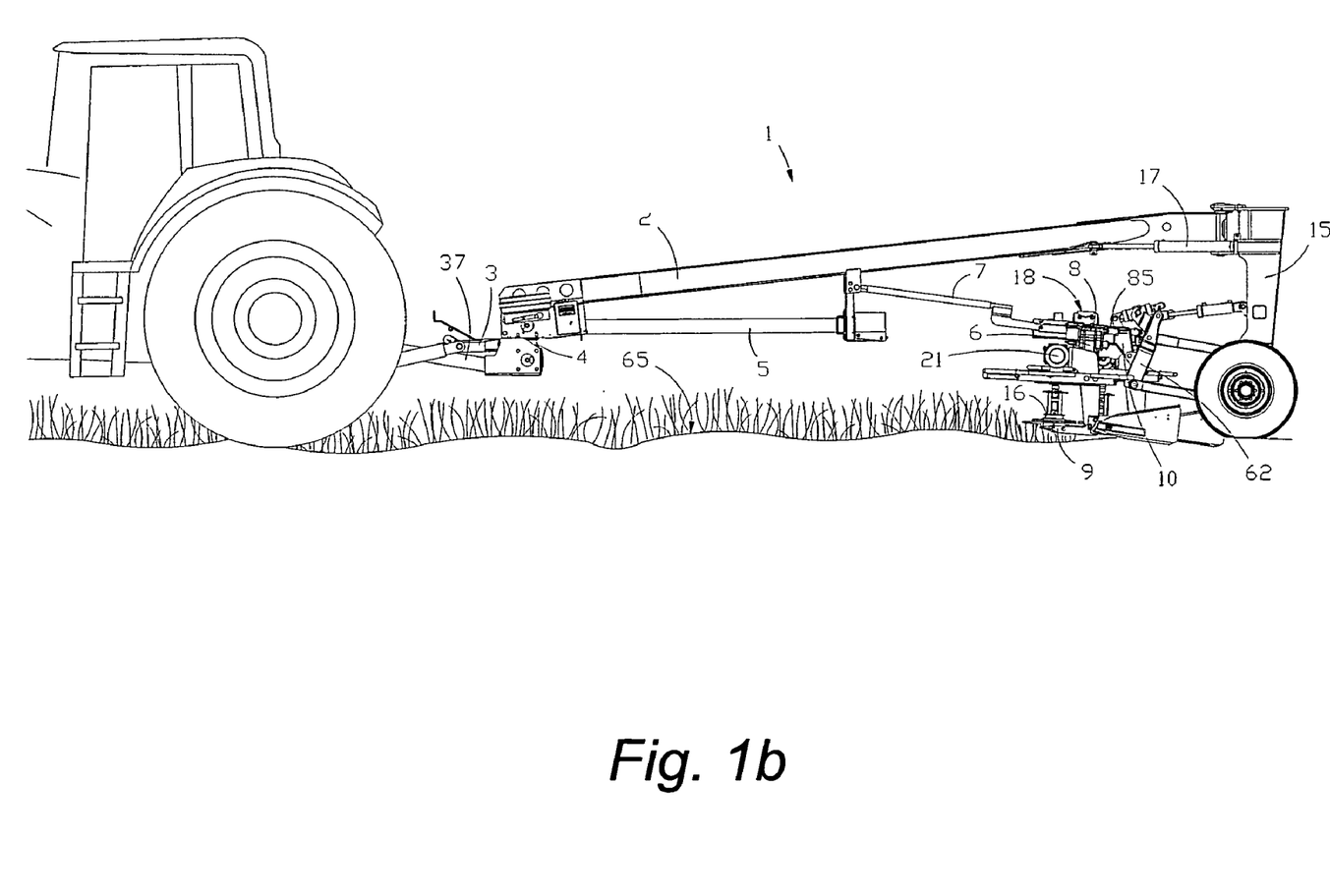
FIG. 1b is a side elevation of the agricultural machine in an operating configuration.
Figure 2A:
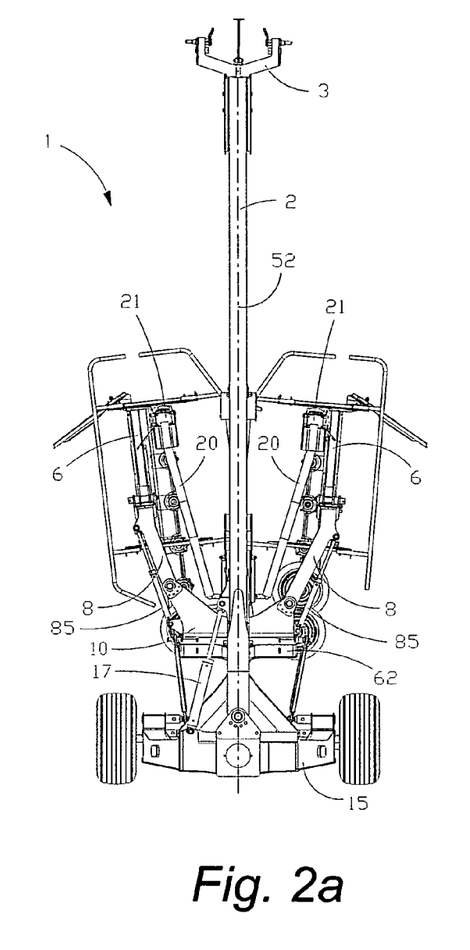
FIG. 2a is a top plan view of the agricultural mower with a sub-frame in the transport configuration.
Figure 2B:
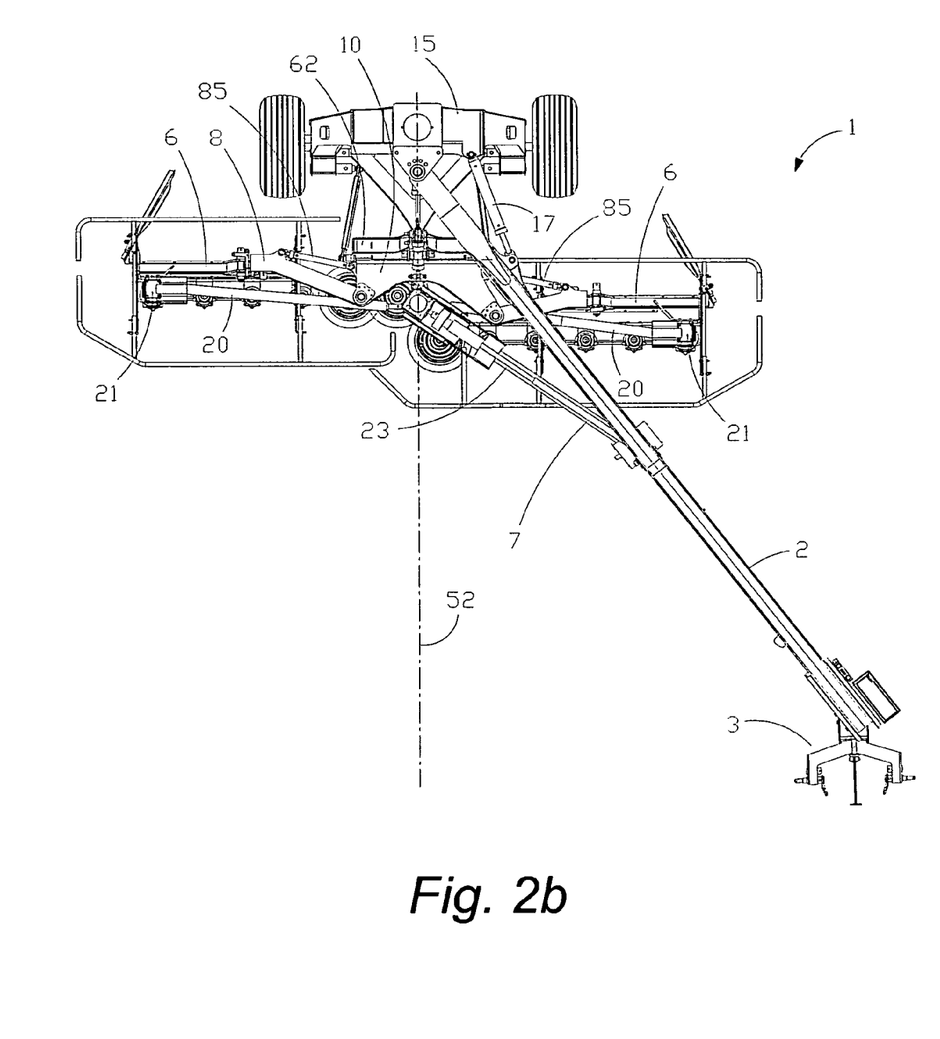
FIG. 2b is a top plan view of the agricultural mower with the sub-frame in the operating configuration and the mower trailing to the right of a tractor.
Figure 2C:
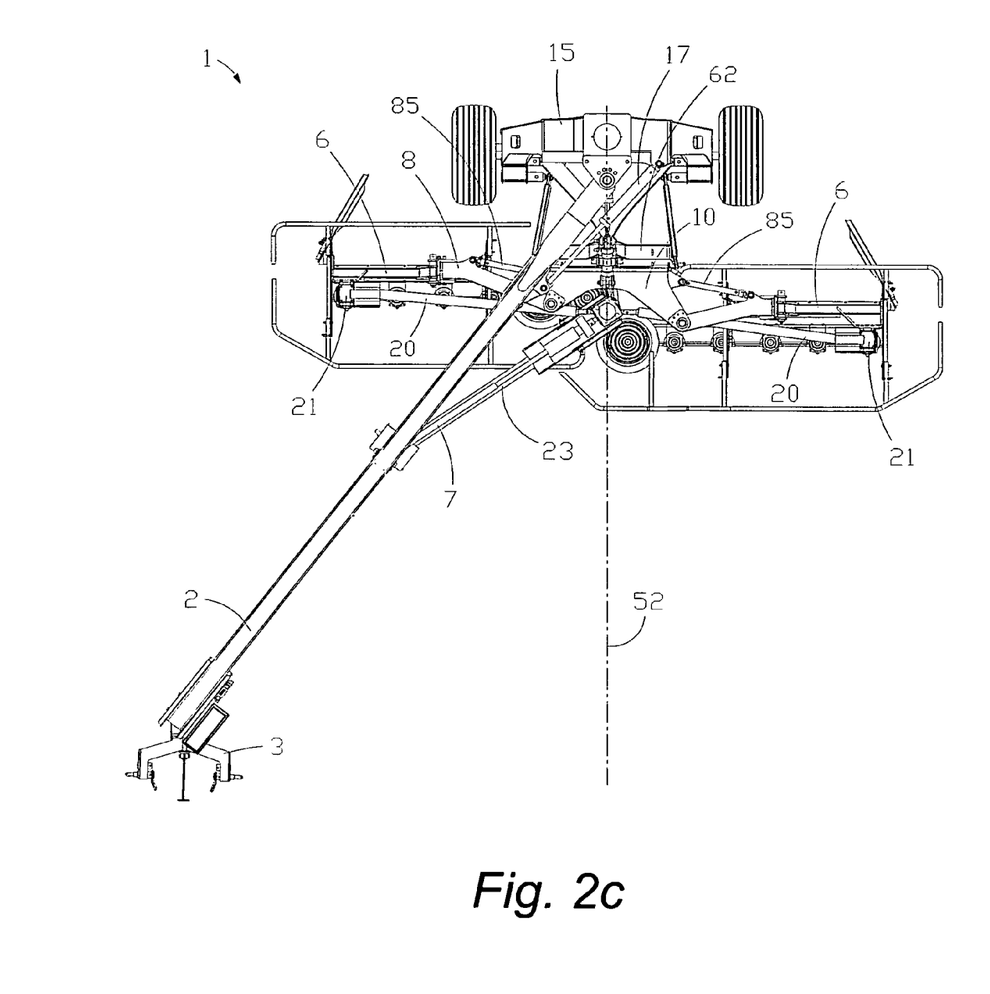
FIG. 2c is a top plan view of the agricultural mower with the sub-frame in the operating configuration and the mower trailing to the left of the tractor.
Figure 3:
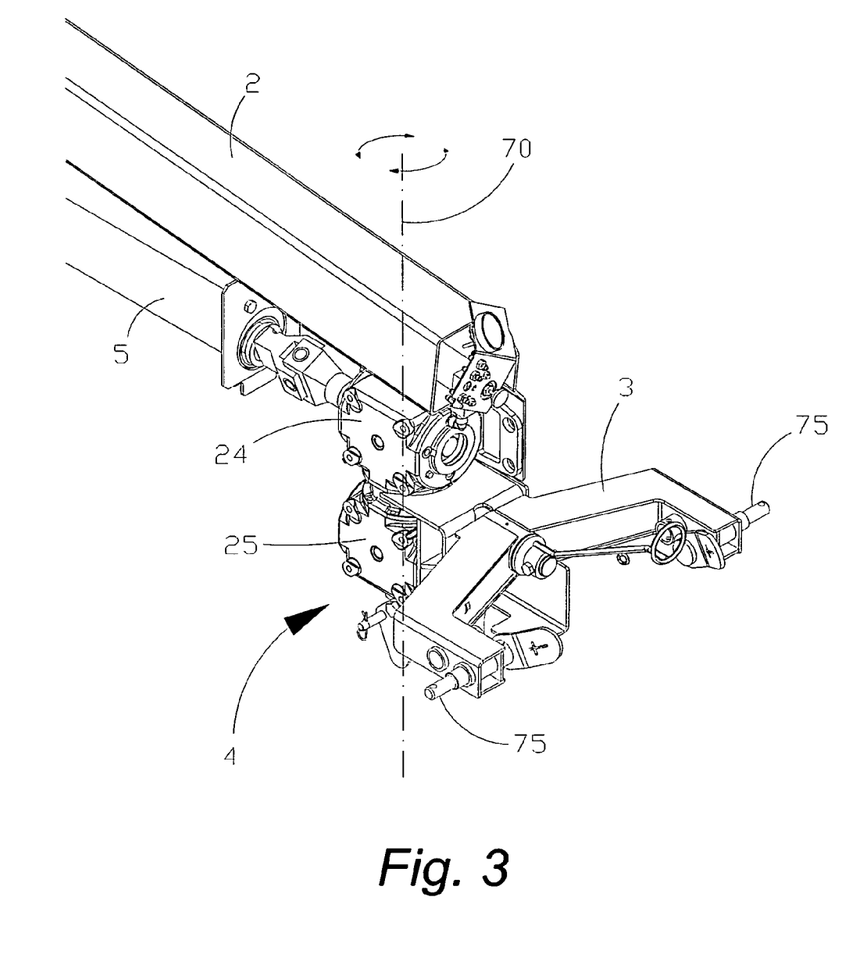
FIG. 3 is a perspective view of the tongue gearboxes, pivotally connected with a vertical axis.

The tongue gearbox system 4 is comprised of an upper gearbox 24 and a lower gearbox 25, shown in FIG. 3, which each alter the axis of rotation of the driveshaft by 90° and also can provide gear reduction. The two gearboxes 24, 25 are pivotally connected with a common shaft defining a vertical axis of rotation 70. This assembly is a swiveling gearbox assembly 4 which allows the upper gearbox 24 to be rigidly mounted to the tongue while allowing the lower gearbox 25 to rotate freely about the vertical axis of rotation 70. With this configuration, the tractor may be positioned by angling the tongue to various angles relative to the longitudinal axis 52 of the agricultural mower 1. This allows the mower 1 to be positioned in a wide variety of locations relative to the towing machine, two of which are illustrated in FIGS. 2b and 2c. The collective change in the orientation of the drive axis of rotation, in the elevational plane, is 0°, as shown in FIG. 1b, such that the main shaft 5 exiting the rear of the tongue gearbox system 4 has an axis of rotation in the longitudinal direction. The rear end of this shaft 5 is supported by a strut mounted on the underside of the tongue 2, and further connects via a universal joint or a Constant Velocity (CV) joint to a secondary shaft 23 (see FIGS. 2b and 2c) which transmits drive power rearward to the upper sub-frame gearbox 35 (FIG. 1a). The output shaft of the upper sub-frame gearbox 35 is also the input shaft of the lower sub-frame gearbox 36, making these two gearboxes 35, 36 a swiveling pair, referred to here as the "sub-frame gearbox system" 18, as described for the tongue gearbox system 4. In the sub-frame gearbox system 18, the lower sub-frame gearbox 36 is rigidly mounted to the sub-frame 10 while the upper sub-frame gearbox 35 rotates freely to stay generally aligned with the tongue 2, via a steering link or steering bar 7. A benefit of the secondary shaft 23 is that the secondary shaft 23 may be oriented at a variable angle with the tongue 2 such that the sub-frame 10 can be raised or lowered relative to the tongue 2 and main frame 15.

The secondary shaft 23 is connected to the sub-frame gearbox system 18 via a universal joint or a constant velocity joint and through a friction clutch 22 which is in-line such that under excessive torque it will disengage the drive system, as is well understood by those of ordinary skill in the art. The swiveling sub-frame gearbox system 18 permits the driveshaft 5, 23 to perform its function even when the tongue 2 is not orthogonal to the sub-frame 10. Clearly, such is allowed by the pivotal mounting of the tongue to the main frame 15, controlled by a swing cylinder 17. A steering bar 7 extends between the sub-frame gearbox system 18 and the tongue strut, and is connected such that the sub-frame 10 is allowed to lift and lower. The upper gearbox 35 alters the axis of rotation of the shaft by 90° into the lower gearbox 36 which changes the rotation angle by 90° again and transmits the rotation into shafts extending out to the headers 6 via universal joints.

The arms 8 are pivotally connected to the sub-frame 10 such that they may rotate about a vertical axis of rotation between a transport position (FIGS. 1a, 2a, and 5) and a mowing position (FIGS. 1b, 2b, and 2c). In the transport position, the arms 8 rotate to a position such that the cutter bars 9 are substantially parallel to the longitudinal axis 52. In the mowing position, the arms rotate to a position such that the cutter bars 9 are substantially perpendicular to the longitudinal axis 52, and are slightly offset relative to one another. The ability to fold in the arms 8 for transport enables a wide-cut agricultural mower 1 to be narrowed sufficiently for legal transport on U.S. roadways. Additionally, because the cutter bars 9 fold within a horizontal plane, the center of mass of the agricultural mower 1 remains low, enhancing stability.

Folding is effected by a folding cylinder 85. Because the folding of the cutter bars 9 does not entail lifting the cutter bars 9, folding may alternatively be performed manually. Folding the cutter bars 9 on a vertical pivot axis 69 on which the arms 8 pivot to the transport position, makes the agricultural mower 1 very stable when compared with the alternative of folding on a horizontal pivot axis. Offsetting the arms 8 and slightly overlapping them in the transverse direction allows the cutter bars 9 to rotate independently, while not missing any crop or being in danger of having their blades impact each other. With the cutterbars 9 offset, the mower is better able to follow the ground contour.

Figure 4:
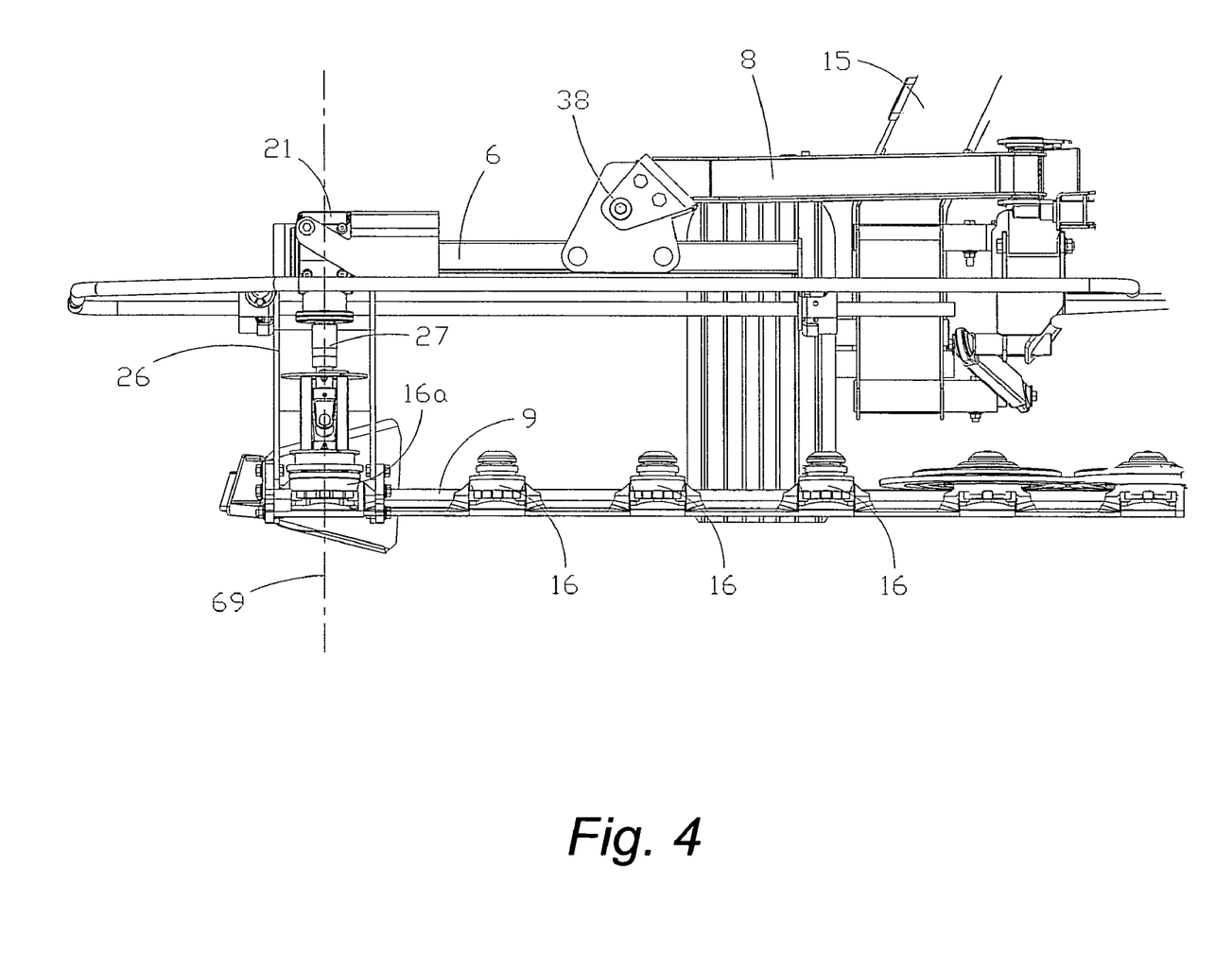
FIG. 4 is a front elevation view of the cutter bar mounted beneath the header at an outer end.

The arm shafts 20 are connected to the lower sub-frame gearbox 36 via universal joints which allow the arms 8 to rotate inward for transport or outward for mowing. In the transport position the universal joints are not intended to allow rotation of the arm shafts 20. Each arm 8 pivotally supports a header 6 with a cylindrical bearing 38 as shown in FIG. 4. This allows rotation of the header 6 with an axis of rotation perpendicular to that header 6, which in the mowing position allows the cutter bars 9 to follow the terrain. The header 6 supports a cutter bar 9 on its outer end by a vertical support structure 26 which is rigidly connected to the header 6. The header 6 further includes a 90° gearbox 21 located at the outer end of the header 6. This entire assembly has a center of gravity approximately located at the pivot point 38, such that the cutter bar 9 will remain level when the header 6 is suspended by the arm 8. The 90° gearbox 21 of each header 6 accepts the arm shafts 20 through universal or CV joints to transmit the rotation through vertical shafts 27 leading to the cutter bars 9. The universal or CV joints allow for the pivoting of the header 6 with respect to the arm 8. Preferably, the cutter bars 9 themselves are supported from above only at their outer ends by the vertical support structure 26, such that the cutter bars 9 are cantilevered from that point inward. The drive shaft to the cutter bar 27 is aligned with this vertical support structure 26, such that the cutter bar supporting structure and drive are in the same space, minimizing disruption to the flow of cut material.

Located at the outer end of each cutter bar 9, a first disk 16a is mounted atop the cutter bar 9. This first disk 16a is specifically designed for accepting the driveshaft 27 from above via a universal joint. The driveshaft 27 is protected by a drum which throws cut material to the side of the driveshaft and discourages wrapping on the shaft as it extends downward from the header 6. The first disk 16a as well as subsequent disks 16 spaced along the cutter bar 9 self-contain small 90° gearboxes. A hexagonal shaft connects the row of cutter disks 16a, 16 and rotates with an axis of rotation substantially parallel to the arm 8. Blades mounted to the cutter disk 16a, 16 are rotated about the vertical axis of each disk 16a, 16 to cut the crop.

The sub-frame 10 is pivotally connected to the main frame 15, forward of the main frame 15 by means of four-bar linkage system. The present invention comprises a four-bar linkage system including an upper set of linkages 12 and a lower set of linkages 11, each comprising two bars as illustrated in FIGS. 6-9.

The novel drive system herein described may be utilized for any implement making use of a floating work tool. The invention is not intended to be limited to agricultural mowers.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method of providing folding of a towed agricultural implement for operation and for transport, the agricultural implement comprising a main frame, a sub-frame articulatable with respect to the main frame, a header, a plurality of work tools operatively attached to the header, and a tongue for operatively, pivotally attaching the towed agricultural implement to a towing vehicle, the method comprising:
    (a) operatively, rotatably attaching at least one ground engaging wheel to the towed agricultural implement main frame, said main frame not a part of a towing vehicle, said ground engaging wheel having a forwardmost point, in a usual direction of travel;
    (b) operatively, pivotally attaching said tongue to the main frame, an angle between the tongue and the main frame in a substantially horizontal plane being variable;
    (c) operatively attaching the tongue to the towing vehicle;
    (d) supporting the main frame with the at least one ground engaging wheel;
    (e) operatively suspending the sub-frame from the main frame on a four-bar linkage;
    (f) operatively, pivotally attaching a first of said plurality of work tools to the sub-frame on a substantially vertical first work tool pivot axis;
    (g) disposing the first work tool pivot axis entirely forward, in the usual direction of travel, of the forwardmost point of the at least one ground engaging wheel;
    (h) operatively attaching a second of said plurality of work tools to the sub-frame on a substantially vertical second work tool pivot axis;
    (i) disposing the second work tool pivot axis forward, in a usual direction of travel, of the forwardmost point of the at least one ground engaging wheel;
    (j) pivoting the first of the plurality of work tools relative to the sub-frame about the first work tool pivot axis to narrow a width of the towed agricultural implement for transport; and
    (k) pivoting the second of the plurality of work tools relative to the sub-frame about the second work tool pivot axis to narrow the width of the towed agricultural implement for transport.

2. The method of claim 1 additionally comprising maintaining the first and second of the plurality of work tools in a substantially horizontal plane while the first and second of the plurality of work tools are pivoted relative to the sub-frame.

3. The method of claim 1, additionally comprising:
    (a) pivoting the first of the plurality of work tools about the first work tool pivot axis to orient a longitudinal axis of the first of the plurality of work tools to be substantially perpendicular to the usual direction of travel to dispose said first of the plurality of work tools for operation; and
    (b) pivoting the second of the plurality of work tools about the second work tool pivot axis to orient a longitudinal axis of the second of the plurality of work tools to be substantially perpendicular to the usual direction of travel to dispose said second of the plurality of work tools for operation.

4. The method of claim 1 additionally comprising disposing longitudinal axes of the first and second of the plurality of work tools substantially parallel to the usual direction of travel for transport.

5. The method of claim 1, additionally comprising:
    (a) operatively connecting a first end of a first driveline to a power takeoff of a towing vehicle;
    (b) operatively connecting a second end of the first driveline to a first shaft of a first tongue gearbox;
    (c) permitting a housing of the first tongue gearbox to rotate about an axis of rotation;
    (d) operatively, connecting a first shaft of a second tongue gearbox to a second shaft of the first tongue gearbox on the axis of rotation of the first tongue gearbox housing;
    (e) operatively, rigidly attaching a housing of the second tongue gearbox to the towed implement tongue;
    (f) operatively connecting a first end of a second driveline to a second shaft of the second tongue gearbox, said second shaft of the second tongue gearbox having an axis of rotation, said axis of rotation being angularly disposed to the first shaft of the second tongue gearbox with an angle different from 0°;
    (g) operatively connecting a second end of the second driveline to a first shaft of a first sub-frame gearbox;
    (h) permitting a housing of the first sub-frame gearbox to rotate about an axis of rotation;
    (i) operatively connecting a first shaft of a second sub-frame gearbox to a second shaft of the first sub-frame gearbox on the axis of rotation of the first sub-frame gearbox housing;
    (j) operatively, rigidly attaching a housing of the second sub-frame gearbox to the towed implement sub-frame; and
    (k) operatively connecting a first end of a third driveline to a second shaft of the second sub-frame gearbox, said second shaft of the second sub-frame gearbox having an axis of rotation, said axis of rotation being angularly disposed to the axis of rotation of the first sub-frame gearbox with an angle different from 0°.

6. The method of claim 5 additionally comprising:
(a) controlling an orientation of the sub-frame relative to the main frame by virtue of the four-bar linkage; and
(b) articulating the sub-frame relative to the frame.

7. The method of claim 5 additionally comprising:
(a) operatively connecting the tongue to the towing vehicle;
(b) varying an angle of the tongue relative to the frame; and
(c) operating the towed implement while maintaining a fixed angle of the tongue relative to the frame.

8. The method of claim 1 additionally comprising supporting the main frame and the header on the ground with only the at least one ground engaging wheel rotatably connected to the main frame.

9. The method of claim 5 additionally comprising:
(a) operatively connecting the tongue to the towing vehicle;
(b) varying an angle of the tongue relative to the frame; and
(c) operating the towed implement while maintaining a fixed angle of the tongue relative to the frame.

10. The method of claim 1 wherein pivoting the second of the plurality of work tools relative to the sub-frame about the second work tool pivot axis comprises pivoting the second of the plurality of work tools in an opposite angular direction than the first of the plurality of work tools.

11. The method of claim 1 wherein pivoting the second of the plurality of work tools relative to the sub-frame about the second work tool pivot axis comprises pivoting the second of the plurality of work tools simultaneously with the first of the plurality of work tools.

12. The method of claim 1 additionally comprising pivoting the first of the plurality of work tools relative to the sub-frame about the first work tool pivot axis to dispose the first of the plurality of work tools of the towed agricultural implement for operation.

13. The method of claim 1 additionally comprising pivoting the second of the plurality of work tools relative to the sub-frame about the second work tool pivot axis to dispose the second of the plurality of work tools of the towed agricultural implement for operation.

14. The method of claim 1 wherein the four-bar linkage comprises a lower link and an upper link, the method additionally comprising:
(a) operatively, pivotally attaching a first end of the lower link to the main frame of the towed agricultural implement;
(b) operatively, pivotally attaching a second end of the lower link to the sub-frame;
(c) operatively, pivotally attaching a first end of the upper link to the main frame;
(d) operatively, pivotally attaching a second end of the upper link to the sub-frame;
(e) operatively, pivotally affixing an actuator to the sub-frame above the upper link;
(f) applying a force to the sub frame with the actuator in a direction toward the main frame;
(g) placing the lower link in tension due to the force;
(h) raising the sub-frame due to the force; and
(i) permitting the sub-frame to self-level due to the tension in the lower link.

15. The method of claim 14 wherein the lower link comprises a first lower link, and the four-bar linkage additionally comprises a second lower link, the method additionally comprising:
(a) operatively, pivotally attaching a first end of the second lower link to the main frame;
(b) operatively, pivotally attaching a second end of the second lower link to the sub-frame;
(c) disposing the first end of the first lower link a greater distance from the first end of the second lower link than the distance from the second end of the first lower link to the second end of the second lower link;
(f) placing the second lower link in tension due to the force; and
(g) permitting the sub-frame to self-level due to the tension in the first lower link and the second lower link.

16. The method of claim 14 wherein the lower link comprises a first lower link, and the four-bar linkage additionally comprises a second lower link, the method additionally comprising:
(a) operatively, pivotally attaching a first end of the second lower link to the main frame;
(b) operatively, pivotally attaching a second end of the second lower link to the sub-frame;
(c) disposing the first end of the first lower link a lesser distance from the first end of the second lower link than the distance from the second end of the first lower link to the second end of the second lower link;
(f) placing the second lower link in tension due to the force; and
(g) permitting the sub-frame to self-level due to the tension in the first lower link and the second lower link.

17. A method of providing folding of a towed agricultural implement for operation and for transport, the agricultural implement comprising a main frame, a header, a plurality of work tools operatively attached to the header, and a tongue for attaching the towed agricultural implement to a towing vehicle, the method comprising:
(a) operatively, rotatably attaching at least one ground engaging wheel to the main frame, said main frame not a part of a towing vehicle, said at least one ground engaging wheel having a forwardmost point, in a usual direction of travel;
(b) operatively, pivotally attaching the tongue to the main frame, an angle in a substantially horizontal plane between the tongue and the main frame being variable;
(c) operatively attaching the tongue to the towing vehicle;
(d) operatively, pivotally attaching the first of the plurality of work tools to the main frame on a substantially vertical first work tool pivot axis;
(e) disposing said first work tool pivot axis forward, in the usual direction of travel, of the forwardmost point of the at least one ground engaging wheel;
(f) operatively, pivotally attaching the second of the plurality of work tools to the main frame on a second work tool pivot axis;
(g) disposing said second work tool pivot axis forward of the fowardmost point of the at least one ground engraving wheel;
(h) supporting both the main frame and the header on the ground with the at least one ground engaging wheel rotatably attached to the main frame;
(i) pivoting a first of the plurality of work tools relative to the main frame about the first work tool pivot axis to narrow a width of the towed agricultural implement for transport; and
(j) pivoting the second of the plurality of work tools relative to the main frame about the second work tool pivot axis to narrow the width of the towed agricultural implement for transport.

18. The method of claim 17 additionally comprising maintaining the first and second of the plurality of work tools in substantially horizontal planes while the first and second of the plurality of work tools are pivoted relative to the main frame.

19. The method of claim 17, additionally comprising:

(a) pivoting the first of the plurality of work tools about the first work tool pivot axis to orient a longitudinal axis of the first of the plurality of work tools to be substantially perpendicular to the usual direction of travel to dispose said first of the plurality of work tools for operation; and (b) pivoting the second of the plurality of work tools about the second work tool pivot axis to orient a longitudinal axis of the second of the plurality of work tools to be substantially perpendicular to the usual direction of travel to dispose said second of the plurality of work tools for operation.

20. The method of claim 17 additionally comprising disposing longitudinal axes of the first and second of the plurality of work tools substantially parallel to the usual direction of travel for transport.

21. The method of claim 17 additionally comprising:

(a) operatively connecting a first end of a first driveline to a power takeoff of a towing vehicle;

(b) operatively connecting a second end of the first driveline to a first shaft of a first tongue gearbox;

(c) permitting a housing of the first tongue gearbox to rotate about an axis of rotation;

(d) operatively, connecting a first shaft of a second tongue gearbox to a second shaft of the first tongue gearbox on the axis of rotation of the first tongue gearbox housing;

(e) operatively, rigidly attaching a housing of the second tongue gearbox to the towed implement tongue;

(f) operatively connecting a first end of a second driveline to a second shaft of the second tongue gearbox said second shaft of the second tongue gearbox having an axis of rotation, said axis of rotation being angularly disposed to the first shaft of the second tongue gearbox with an angle different from 0°;

(g) operatively connecting a second end of the second driveline to a first shaft of a first frame gearbox;

(h) permitting a housing of the first frame gearbox to rotate about an axis of rotation;

(i) operatively connecting a first shaft of a second frame gearbox to a second shaft of the first frame gearbox on the axis of rotation of the first frame gearbox housing;

(j) operatively, rigidly attaching a housing of the second frame gearbox to the towed implement frame; and (k) operatively connecting a first end of a third driveline to a second shaft of the second frame gearbox, said second shaft of the second frame gearbox having an axis of rotation, said axis of rotation being angularly disposed to the axis of rotation of the first frame gearbox with an angle different from 0°.

22. The method of claim 21 additionally comprising:

(a) operatively connecting the tongue to the towing vehicle;

(b) varying an angle of the tongue relative to the frame; and (c) operating the towed implement while maintaining a fixed angle of the tongue relative to the frame.

23. The method of claim 21 additionally comprising:

(a) operatively connecting the tongue to the towing vehicle;

(b) varying an angle of the tongue relative to the frame; and (c) operating the towed implement while maintaining a fixed angle of the tongue relative to the frame.

24. The method of claim 17 wherein pivoting the second of the plurality of work tools relative to the main frame comprises pivoting the second of the plurality of work tools in an opposite angular direction than the first of the plurality of work tools.

25. The method of claim 17 wherein pivoting the second of the plurality of work tools relative to the main frame comprises pivoting the second of the plurality of work tools simultaneously with the first of the plurality of work tools.

26. The method of claim 17 additionally comprising pivoting the first of the plurality of work tools relative to the main frame about the first work tool pivot axis to dispose the first of the plurality of work tools of the towed agricultural implement for operation.

27. The method of claim 17 additionally comprising pivoting the second of the plurality of work tools relative to the main frame about the second work tool pivot axis to dispose the second of the plurality of work tools of the towed agricultural implement for operation.

* * * * *